(12) United States Patent
Liu (10) Patent No.: US 10,389,862 B2
(45) Date of Patent: Aug. 20, 2019

(54) MOBILE DEVICE AND DIAL PAD THEREOF

(71) Applicant: BEIJING BYTEDANCE NETWORK TECHNOLOGY CO LTD., Beijing (CN)

(72) Inventor: Fei Liu, Beijing (CN)

(73) Assignee: Beijing Bytedance Network Technology Co Ltd., Beijing (CN)

( * ) Notice: Subject to any disclaimer, the term of this patent is extended or adjusted under 35 U.S.C. 154(b) by 0 days.

(21) Appl. No.: 15/305,273

(22) PCT Filed: Apr. 17, 2015

(86) PCT No.: PCT/CN2015/076826
§ 371 (c)(1),
(2) Date: Oct. 19, 2016

(87) PCT Pub. No.: WO2015/161756
PCT Pub. Date: Oct. 29, 2015

(65) Prior Publication Data
US 2017/0041447 A1  Feb. 9, 2017

(30) Foreign Application Priority Data
Apr. 22, 2014  (CN) .......................... 2014 1 0163528

(51) Int. Cl.
*H04M 1/23* (2006.01)
*H04M 1/725* (2006.01)
*G06F 3/0488* (2013.01)

(52) U.S. Cl.
CPC .... *H04M 1/72519* (2013.01); *G06F 3/04886* (2013.01); *H04M 1/23* (2013.01); *H04M 2250/22* (2013.01)

(58) Field of Classification Search
CPC .................. H04M 1/72519; G06F 3/04886
See application file for complete search history.

(56) References Cited

U.S. PATENT DOCUMENTS

2002/0132635 A1  9/2002  Girard et al.
2003/0181224 A1*  9/2003  Peng ........................ H04M 1/26
                                              455/565
(Continued)

FOREIGN PATENT DOCUMENTS

CN  2440296 Y  7/2001
CN  1809091 A  7/2006
(Continued)

OTHER PUBLICATIONS

State Intellectual Property Office as the International Searching Authority, International Search Report and Written Opinion for PCT Application No. PCT/CN2015/076826, dated Jul. 23, 2015.
(Continued)

*Primary Examiner* — Md K Talukder
(74) *Attorney, Agent, or Firm* — Mauriel Kapouytian Woods, LLP; Michael Mauriel (57) ABSTRACT

Provided are a mobile device and dial pad thereof The dial pad comprises a first key area and a second key area, the first key area being used for numeric keys and the second key area being used for symbol keys and/or function keys; when a user uses the dial pad, the numeric keys are commonly used keys but the symbol keys and function keys are un-commonly used keys. In the prior art, un-commonly used keys are placed in the favorable positions on the dial pad while commonly used keys are in unfavorable places. The dial pad provided in the present invention separate the common keys from un-common keys to allow the common numeric keys to be relatively concentrated and reduce the range, thus shortening movement distance between numeric keys touched by a user, and further improving dialing accuracy and efficiency.

11 Claims, 7 Drawing Sheets

(56) References Cited

U.S. PATENT DOCUMENTS

| | | | |
|---|---|---|---|
| 2004/0104896 A1* | 6/2004 | Suraqui | G06F 3/0237 345/168 |
| 2004/0196270 A1* | 10/2004 | Chiu | G06F 3/044 345/174 |
| 2006/0107037 A1* | 5/2006 | Lincoln | G06F 21/12 713/155 |
| 2006/0227100 A1* | 10/2006 | Kun | G06F 3/0236 345/156 |
| 2007/0129050 A1* | 6/2007 | Ryu | G06F 1/1626 455/403 |
| 2007/0192713 A1* | 8/2007 | Lee | G06F 3/0236 715/764 |
| 2008/0141125 A1* | 6/2008 | Ghassabian | G06F 3/0237 715/261 |
| 2008/0224897 A1* | 9/2008 | Silva | G06F 3/021 341/22 |
| 2009/0212980 A1* | 8/2009 | Hisada | G06F 3/0236 341/28 |
| 2010/0173668 A1* | 7/2010 | Marui | G06F 1/1626 455/556.1 |
| 2010/0197353 A1* | 8/2010 | Marui | G06F 3/04886 455/566 |
| 2010/0242104 A1* | 9/2010 | Wankmueller | G06F 21/36 726/9 |
| 2010/0248793 A1* | 9/2010 | Czajkowski | H04M 1/72519 455/569.1 |
| 2011/0163973 A1* | 7/2011 | Ording | G06F 3/0236 345/173 |
| 2012/0013538 A1* | 1/2012 | Yu | G06F 3/04886 345/171 |
| 2012/0082306 A1* | 4/2012 | Hulse | H04L 9/36 380/28 |
| 2012/0326984 A1* | 12/2012 | Ghassabian | G06F 3/0236 345/168 |
| 2013/0057475 A1* | 3/2013 | Duggan | G06F 3/04886 345/168 |
| 2013/0234948 A1* | 9/2013 | Jian | G06F 3/0487 345/169 |
| 2014/0035823 A1* | 2/2014 | Khoe | G06F 3/02 345/171 |
| 2014/0115523 A1* | 4/2014 | Seo | G06F 3/0233 715/773 |
| 2015/0154414 A1* | 6/2015 | Pike | G06F 21/36 726/30 |
| 2016/0026383 A1* | 1/2016 | Lee | G06F 3/04886 715/773 |
| 2016/0070412 A1* | 3/2016 | Shimazu | G06F 3/0416 345/173 |
| 2016/0162181 A1* | 6/2016 | Xu | G06F 3/0237 715/773 |
| 2016/0162182 A1* | 6/2016 | Jia | G06F 3/04886 715/773 |
| 2016/0274788 A1* | 9/2016 | Li | G06F 3/04886 |
| 2017/0041447 A1* | 2/2017 | Liu | G06F 3/04886 |

FOREIGN PATENT DOCUMENTS

| | | | | |
|---|---|---|---|---|
| CN | | 101853136 A | 10/2010 | |
| CN | | 102810039 A | 12/2012 | |
| CN | | 202748770 U | 2/2013 | |
| CN | | 103064629 A | 4/2013 | |
| WO | WO 2012162932 A1 * | 12/2012 | | G06F 3/0238 |

OTHER PUBLICATIONS

State Intellectual Property Office, Chinese Office Action for Application No. 201410163528.0, dated Dec. 28, 2016.
State Intellectual Property Office, Chinese Office Action for Application No. 201410163528.0, dated Mar. 14, 2017.

* cited by examiner

MOBILE DEVICE AND DIAL PAD THEREOF

CROSS REFERENCE TO RELATED APPLICATION

The present disclosure is the national phase of International Application No. PCT/CN2015/076826, titled "MOBILE DEVICE AND DIAL PAD THEREOF," filed on Apr. 17, 2015, which claims priority to Chinese Patent Application No. 201410163528.0, titled "MOBILE DEVICE AND DIALING PANEL THEREOF," filed on Apr. 22, 2014 with the State Intellectual Property Office of the People's Republic of China, the disclosures of which are hereby incorporated by reference their entirety.

TECHNICAL FIELD

The present disclosure relates to the field of mobile communications, and in particular to a mobile device and a dial pad thereof

BACKGROUND

A dial pad refers to an input interface of a smart mobile device having a touch function, which is for inputting a phone number to dial before a call and performing related operations on the phone number. The dial pad is generally arranged in a lower part of a screen. The dial pad includes digit keys 0 to 9 for inputting a phone number, symbol keys asterisk (*) and pound sign (#), a backspace key and a dial key for dialing a number. In most of mobile phone systems, function keys for quickly processing a phone number, such saving the number to contacts, searching for a contact and searching for a public number, are also provided on a dial pad.

With the rapid development of mobile devices with touch screens, the screens of the mobile devices are becoming bigger and bigger, causing more and more inconvenience to a user when the user is dialing a number with a single hand. In practice, digit keys, function keys and symbol keys in a dial pad are provided in a staggered arrangement, and the non-digit keys occupy favorable positions in the dial pad which are close to a finger of a user, pushing the digit keys to unfavorable positions.

As a result, a movement distance for touching the digit keys by the user becomes longer, which is inconvenient for the user to quickly touch the digit keys and reduces input efficiency of the digit keys.

SUMMARY

In view of the above, a mobile device and a dial pad thereof are provided according to the present disclosure. Dialing with the dial pad can be quicker and easier, and input efficiency of digit keys is improved.

To achieve the above object, the following technical means are provided according to the present disclosure.

A dial pad for a mobile device is provided, which includes a first key region and a second key region, where the first key region is for accommodating digit keys, and the second key region is for accommodating a symbol key and/or a function key.

Preferably, the first key region and the second key region are rectangular regions, and the first key region is arranged at a side of the dial pad.

Preferably, the digit keys 0 to 9 are arranged in a form of grids in the first key region, and sizes of the digit keys 0 to 9 are the same.

Preferably, the first key region is arranged at a right side of the dial pad, and the second key region is arranged at a left side of the dial pad.

Preferably, the first key region is arranged at a left side of the dial pad, and the second key region is arranged at a right side of the dial pad.

Preferably, the second key region includes a mode switching key configured to switch positions of the first key region and the second key region.

Preferably, the first key region further includes a dial key.

Preferably, the first key region further includes a backspace key.

Preferably, the second key region includes: symbol keys asterisk * and pound sign #.

Preferably, the dial pad includes 4×4 grids, i.e., 16 grids, with identical sizes, the first key region includes 3×4 grids, i.e., 12 grids, and the second key region includes 1×4 grids, i.e., 4 grids.

A mobile device is provided, which includes the dial pad according to any of the descriptions above.

For a user using a dial pad, digit keys are frequently used keys, and symbol keys and function keys are infrequently used keys. In conventional technology, the infrequently used keys occupy favorable positions in the dial pad, and the frequently used keys are pushed to unfavorable positions. In the dial pad according to the present disclosure, frequently used keys and infrequently used keys are arranged separately. As a result, positions of the digit keys frequently used are concentrated, and a range thereof is reduced, resulting in a shorter movement distance for touching the digit keys by the user and further, improving accuracy and efficiency of dialing.

BRIEF DESCRIPTION OF THE DRAWINGS

In order to illustrate technical solutions in embodiments of the present disclosure or in conventional technology more clearly, drawings used in the description of the embodiments or conventional technology are introduced briefly hereinafter. Apparently, the drawings described hereinafter merely illustrate some embodiments of the invention, and other drawings may be obtained by those skilled in the art based on these drawings without any creative efforts.

DETAILED DESCRIPTION OF THE EMBODIMENTS

Figure 1:
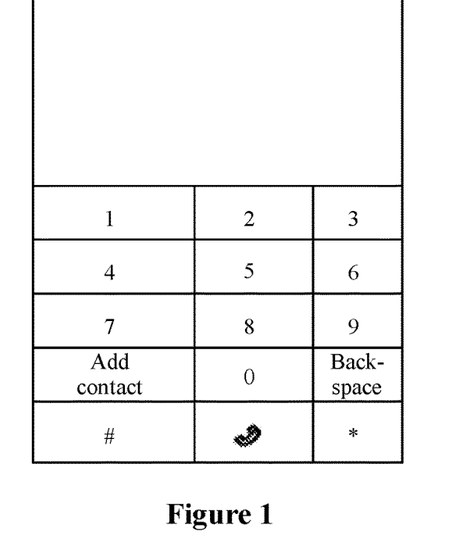
FIG. 1 is a schematic diagram of a layout of a dial pad in conventional technology.

Technologies related to dial pads are studied and analyzed by the inventor. It is found that there is much to be improved for a conventional dial pad. For example, various keys in the dial pad may be arranged non-uniformly. As shown in FIG. 1, touch areas of keys 1, 4 and 7 which are distant from a finger of a user are increased, making keys in a left side easier to touch.

In practice, for a user used to a standard digital panel (which does not merely refer to a dial pad, and is common in calculators, numeric keypads of computers, and keypads of bank ATMs), not only is efficiency of quick inputting not improved, but also mistakes may occur in keystrokes due to the non-uniform layout. Therefore, the inventor recognizes that the dial pad needs to be improved, to improve accuracy and efficiency of inputting for a user. In view of this, the following is provided by the inventor.

The technical solutions in embodiments of the present disclosure are clearly and completely described hereinafter in conjunction with the drawings in the embodiments of the present disclosure. Apparently, the described embodiments are only a few rather than all of the embodiments of the invention. All other embodiments obtained by those skilled in the art based on the embodiments of the present disclosure without any creative efforts fall within the protection scope of the present disclosure.

Dialing is one of the most important functions for various mobile devices such as a mobile phone, which serve as communication tools. On a smart mobile phone having a touch function, a layout of a dial pad has great flexibility, since a system can change a visual style of the dial pad and add more functions that are powerful. In addition, as screens of mobile phones are becoming bigger and bigger, it is increasingly important to design a more user-friendly and comfortable dial pad.

Figure 2:
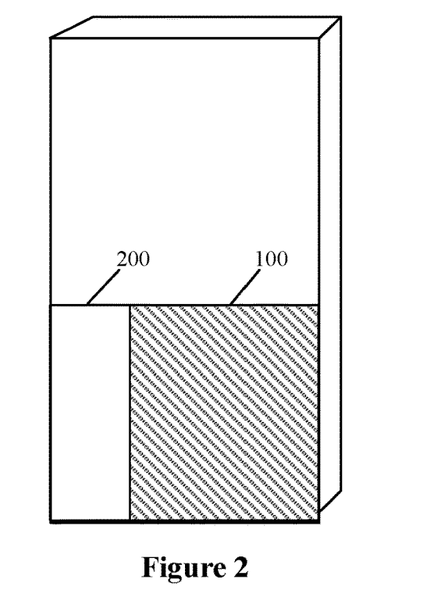
FIG. 2 is a schematic diagram of a layout of a dial pad according to an embodiment of the present disclosure.

In view of the above, a dial pad is provided according to the present disclosure. As shown in FIG. 2, the dial pad includes a first key region 100 and a second key region 200. The first key region 100 is for accommodating digit keys, and the second key region 200 is for accommodating a symbol key and/or a function key.

For a user using a dial pad, digit keys are frequently used keys, and symbol keys and function keys are infrequently used keys. In conventional technology, the infrequently used keys occupy favorable positions in the dial pad, and the frequently used keys are pushed to unfavorable positions. In the dial pad according to the present disclosure, frequently used keys and infrequently used keys are arranged separately. As a result, positions of the digit keys frequently used are concentrated, and a range thereof is reduced, resulting in a shorter movement distance for touching the digit keys by the user and further, improving accuracy and efficiency of dialing.

In the present disclosure, the frequently used keys and infrequently used keys are arranged separately. The first key region 100 is for accommodating the frequently used keys, and the second key region 200 is for accommodating the infrequently used keys. It should be noted that "first key region 100" and "second key region 200" are merely used for purpose of distinguishing rather than representing priority in order.

Preferably, the first key region 100 and the second key region 200 are rectangular regions, and the first key region 100 is arranged at a side of the dial pad. To introduce a layout of the dial pad in detail, a positional relationship between the first key region 100 and the second key region 200 is described in conjunction with the drawings.

Reference is made to FIG. 2, which shows a positional relationship between the two key regions. The first key region 100 is arranged at a right side of the dial pad, and the second key region 200 is arranged at a left side of the dial pad.

Figure 3:
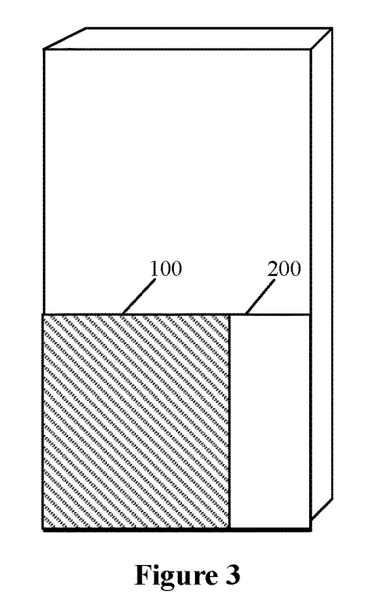
FIG. 3 is a schematic diagram of a layout of a dial pad according to another embodiment of the present disclosure.

Reference is made to FIG. 3, which shows another positional relationship between the two key regions. The first key region 100 is arranged at a left side of the dial pad, and the second key region 200 is arranged at a right side of the dial pad.

Figure 4:
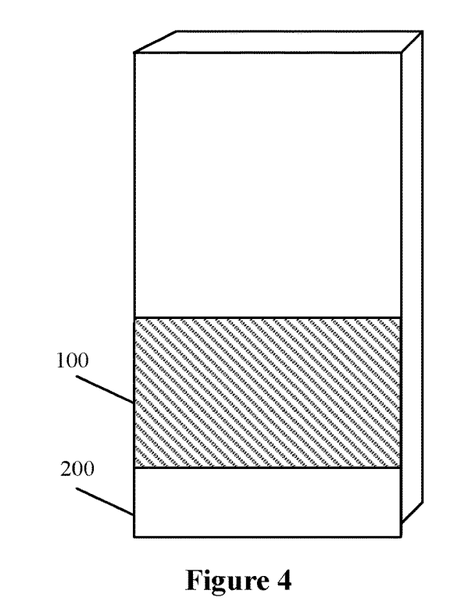
FIG. 4 is a schematic diagram of a layout of a dial pad according to still another embodiment of the present disclosure.

Reference is made to FIG. 4, which shows another positional relationship between the two key regions. The first key region 100 is arranged at an upper side of the dial pad, and the second key region is arranged at a lower side of the dial pad.

Figure 5:
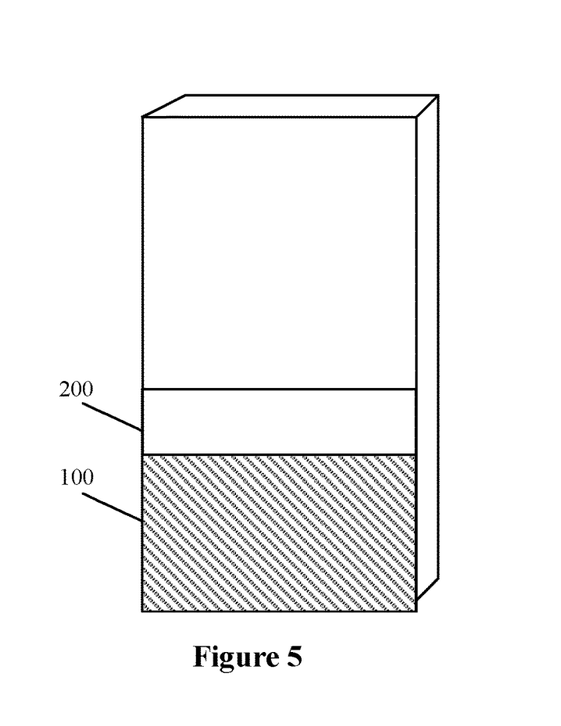
FIG. 5 is a schematic diagram of a layout of a dial pad according to still another embodiment of the present disclosure.

Reference is made to FIG. 5, which shows another positional relationship between the two key regions. The first key region 100 is arranged at a lower side of the dial pad, and the second key region 200 is arranged at an upper side of the dial pad.

Grids where the first key region 100 and the second key region 200 according to the above embodiments are located are of the same width or of the same height, and the positional relationship is relatively fixed. Other positional relationships between the first key region and the second key region are described hereinafter.

Figure 6:
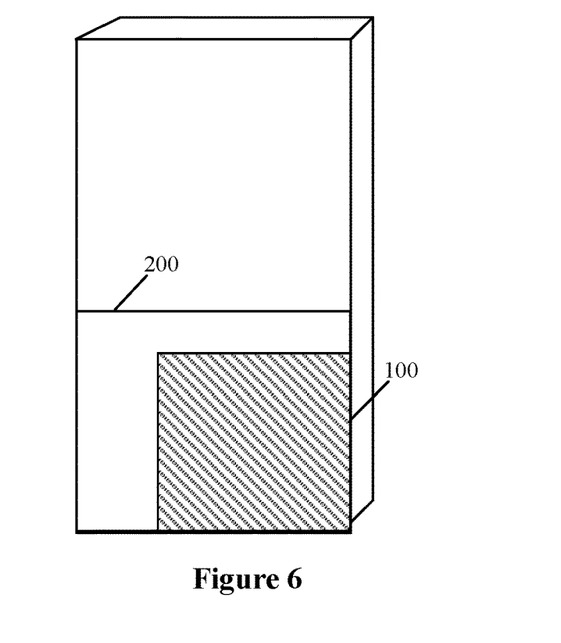
FIG. 6 is a schematic diagram of a layout of a dial pad according to still another embodiment of the present disclosure.

Reference is made to FIG. 6, which shows another positional relationship between the two key regions. Two edges of the first key region 100 closely contact edges of the dial pad, which results in an increased area of the second key region 200 for accommodating more symbol keys or function keys.

Figure 7:
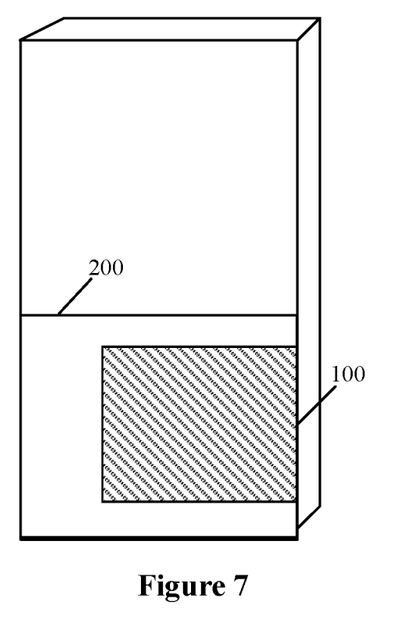
FIG. 7 is a schematic diagram of a layout of a dial pad according to still another embodiment of the present disclosure.

Reference is made to FIG. 7, which shows another positional relationship between the two key regions. One edge of the first key region 100 according to the embodiment closely contacts an edge of the dial pad. Compared with the embodiment shown in FIG. 6, an area of the first key region 100 is reduced, and an area of the second key region 200 is increased, which facilitates frequently using the symbol key and the function key by the user. In addition, an interface for the digit keys is relatively reduced, which improves input efficiency of the symbol key and the function key without affecting input accuracy.

FIGS. 2 to 7 clearly show the position relationships between the first key region 100 and the second key region 200. It should be noted that the areas of the first key region 100 and the second key region 200 shown in FIGS. 2 to 7 are not invariable. FIGS. 2 to 7 merely show relative positional relationships between the two regions without setting the areas of the two regions.

Figure 8:
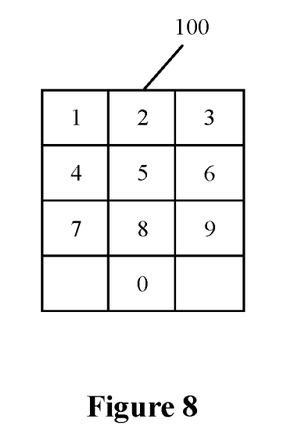
FIG. 8 is a schematic diagram of a layout of a first key region of a dial pad according to an embodiment of the present disclosure.

In the present disclosure, the first key region is for accommodating the digit keys. Preferably, as shown in FIG.

8, the digit keys 0 to 9 are arranged in a form of grids in the first key region, and sizes of the digit keys 0 to 9 are the same.

In the present disclosure, the digit keys 0 to 9 are arranged in a form of grids, and the sizes of the digit keys 0 to 9 are the same, i.e., the digit keys are provided in a uniform arrangement. In this way, an input habit of the user will not be changed, and an original layout of keys which is symmetrical and uniform is not broken in the present disclosure, which maintains a good visual effect.

Figure 9:
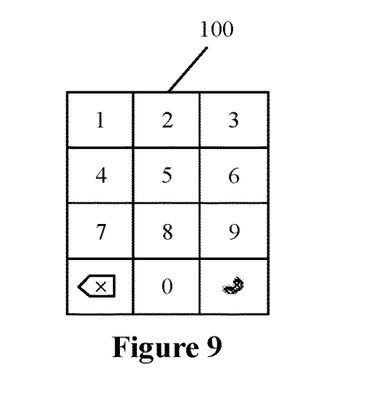
FIG. 9 is a schematic diagram of a layout of a first key region of a dial pad according to another embodiment of the present disclosure.

Preferably, as shown in FIG. 9, the first key region further includes a dial key and a backspace key. Since the user may make a mistake when dialing, the backspace key is arranged in the first key region 100, to enable the user to delete content inputted via a key touched mistakenly. In general, after the user has inputted an 11-digit phone number, the number is dialed via the dial key. Therefore, the dial key is arranged in the first key region 100 for convenience of dialing of the user.

In the present disclosure, the second key region 200 is for accommodating the symbol key and/or the function key.

The symbol key and/or the function key is arranged in the second key region 200. That is, in the present disclosure, the second key region 200 may be provided with different interfaces for usage habits of different users. If one or more of symbol keys are frequently used by a user, the symbol keys are arranged in the second key region 200. If one or more function keys are frequently used by a user, the function keys are arranged in the second key region 200. Or, symbol keys and function keys which are frequently used are all arranged. It should be noted that not all keys which are frequently used can be arranged in the second key region 200. In consideration of a size of the second key region 200, keys may be selectively arranged in the second key region.

Preferably, the second key region includes: symbol keys asterisk * and pound sign #.

On the basis of the above embodiments, a specific example of the dial pad is provided according to the present disclosure. The dial pad includes 4×4 grids, i.e., 16 grids, with identical sizes. The first key region includes 3×4 grids, i.e., 12 grids, and the second key region includes 1×4 grids, i.e., 4 grids.

Figure 10:
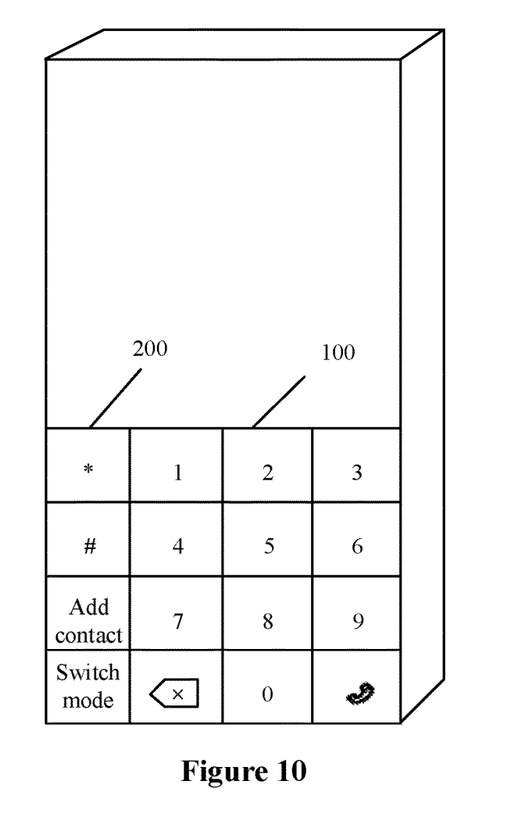
FIG. 10 is a schematic diagram of a layout of a dial pad according to still another embodiment of the present disclosure.

For usage habits of different users, two modes are further provided according to the present disclosure. Reference is made to FIG. 10, which shows a layout of a first mode. The first key region 100 is arranged at a right side of the dial pad, and the second key region 200 is arranged at a left side of the dial pad. The first mode is applicable to a user touching a key with a right hand.

Figure 11:
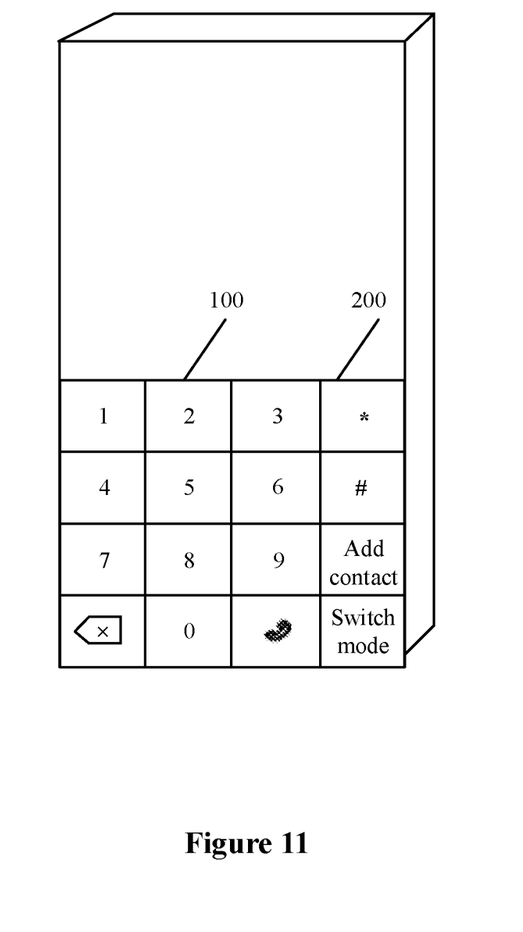
FIG. 11 is a schematic diagram of a layout of a dial pad according to still another embodiment of the present disclosure.

Reference is made to FIG. 11, which shows a layout of a second mode. The first key region 100 is arranged at a left side of the dial pad, and the second key region 200 is arranged at a right side of the dial pad. The second mode is applicable to a user touching a key with a left hand.

To facilitate switching of the two modes by a user, a mode switching key is provided in the second key region 200 according to the present disclosure, as shown in FIG. 10 or FIG. 11. The user can switch between the first mode and the second mode by tapping the key, which provides convenience for users having different usage habits.

Figure 12:
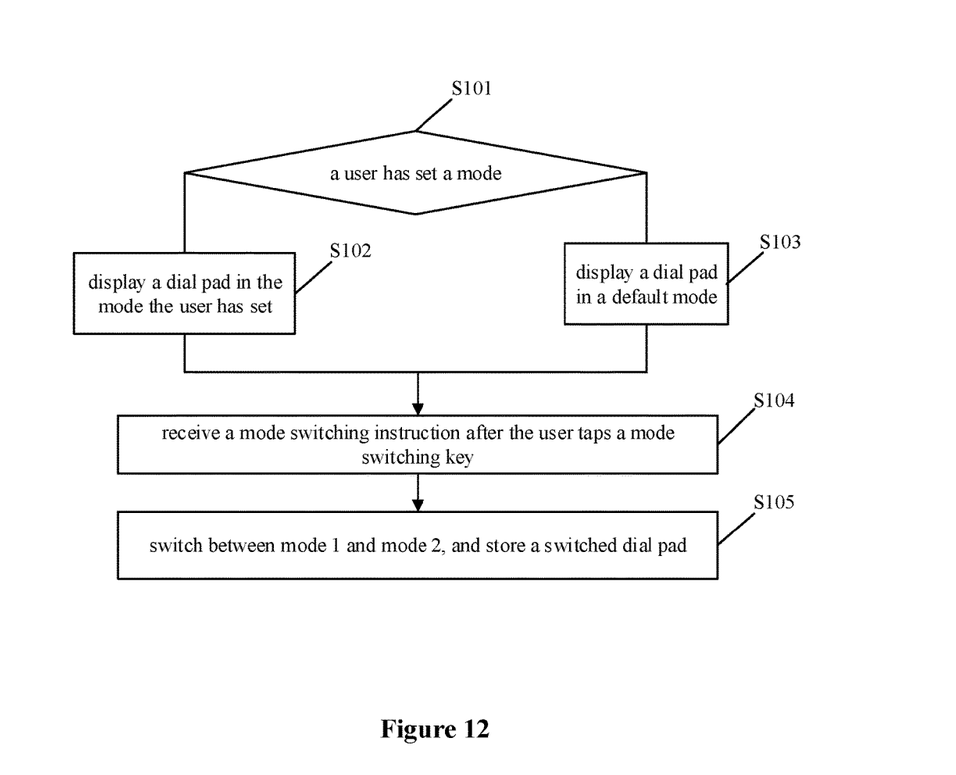
FIG. 12 is a flow chart of an application method for a dial pad according to an embodiment of the present disclosure.

Two specific embodiments are provided in the present disclosure, as shown in FIG. 10 and FIG. 11. On the basis of the above, an application method for a dial pad is further provided according to the present disclosure. As shown in FIG. 12, the method includes:

step S101, determining whether a user has set a mode, entering step S102 in a case that the user has set a mode, and entering step S103 in a case that the user has not set a mode;

step S102, displaying a dial pad in the mode the user has set;

step S103, displaying a dial pad in a default mode;

step S104, receiving a mode switching instruction after the user taps a mode switching key; and step S105, switching between mode 1 and mode 2, and storing a switched dial pad.

A mobile device is further provided according to the present disclosure, which includes the dial pad shown in any one of FIGS. 2 to 7.

If a function described in the method according to the embodiments is implemented in a form of a software functional unit and is sold or used as a separate product, it may be stored in a computer readable storage medium. Based on such an understanding, part of the embodiments of the present disclosure which contributes to conventional technology, or, part of the technical solutions may be implemented in a form of a software product, and the software product is stored in a storage medium and includes some instructions for a computer device (which may be a personal computer, a server, a mobile computer device or a network device, etc.) to execute all or some of the steps in the method according to the embodiments of the present disclosure. The storage medium includes a medium capable of storing program codes, such as a USB flash disk, a mobile hard disk, a read-only memory (ROM, Read-Only Memory), a random access memory (RAM, Random Access Memory), a disk or a compact disc.

The embodiments of the present disclosure are described in a progressive manner, differences from other embodiments are emphatically illustrated in each of the embodiments, and reference can be made to each other for understanding the same or similar sections.

The above descriptions of the disclosed embodiments enable those skilled in the art to implement or use the present disclosure. Various changes to the embodiments are obvious to those skilled in the art, and general principles defined herein may be implemented in other embodiments without departing from the spirit or scope of the present disclosure. Therefore, the invention is not limited to the embodiments according to the present disclosure but is to conform to the widest scope consistent with the principles and novel features disclosed herein.

What is claimed is:

1. A dial pad for a mobile device, comprising:
   a first key region, wherein the first key region is for accommodating digit keys 0 to 9, the digit keys 0 to 9 are arranged in a form of grids in the first key region, sizes of the digit keys 0 to 9 are the same, and the first key region is a rectangular region arranged at a right side of the dial pad;
   a second key region, wherein the second key region is for accommodating all symbol keys on the dial pad, the second key region is a rectangular region arranged at a left side of the dial pad, the second key region comprises a mode switching key configured to switch positions of the first key region and the second key region; and
   wherein the dial pad is displayed on a display screen of the mobile device when a user dials a number, and the dial pad is configured to input a phone number to dial.

2. The dial pad according to claim 1, wherein the first key region is arranged at a left side of the dial pad, and the second key region is arranged at a right side of the dial pad.

3. The dial pad according to claim 2, wherein the second key region comprises a mode switching key configured to switch positions of the first key region and the second key region.

4. The dial pad according to claim 1, wherein the first key region further comprises a dial key.

5. The dial pad according to claim 1, wherein the first key region further comprises a backspace key.

6. The dial pad according to claim 1, wherein the second key region comprises:
symbol keys asterisk * and pound sign #.

7. The dial pad according to claim 1, wherein the dial pad comprises 4×4 grids, i.e., 16 grids, with identical sizes, the first key region comprises 3×4 grids, i.e., 12 grids, and the second key region comprises 1×4 grids, i.e., 4 grids.

8. A mobile device comprising the dial pad according to claim 1.

9. The dial pad according to claim 1, wherein the dial pad comprises 4×4 grids, i.e., 16 grids, with identical sizes, the first key region comprises 3×4 grids, i.e., 12 grids, and the second key region comprises 1×4 grids, i.e., 4 grids.

10. The dial pad according to claim 1, wherein the first key region and the second key region are of the same width or of the same height.

11. The dial pad according to claim 1, wherein the keys are rearranged in the second key region according to frequency of the keys used by the user.

* * * * *